(12) United States Patent
Gupta et al.

(10) Patent No.: US 10,229,008 B2
(45) Date of Patent: *Mar. 12, 2019

(54) INCREASING DISASTER RESILIENCY BY HAVING A POD BACKED UP TO OTHER PEER PODS IN A SITE OR BEYOND

(71) Applicant: International Business Machines Corporation, Armonk, NY (US)

(72) Inventors: Manish Gupta, New Delhi (IN); Richard E. Harper, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 86 days.

This patent is subject to a terminal disclaimer.

(21) Appl. No.: 15/236,542

(22) Filed: Aug. 15, 2016

(65) Prior Publication Data

US 2016/0350189 A1 Dec. 1, 2016

Related U.S. Application Data

(63) Continuation of application No. 14/243,405, filed on Apr. 2, 2014, now Pat. No. 9,436,560.

(51) Int. Cl.
*G06F 11/14* (2006.01)

(52) U.S. Cl.
CPC ...... *G06F 11/1461* (2013.01); *G06F 11/1451* (2013.01); *G06F 11/1464* (2013.01);
(Continued)

(58) Field of Classification Search
CPC ........... G06F 2201/815; G06F 11/1458; G06F 11/1461; G06F 11/1464; G06F 11/1471; G06F 11/1456
See application file for complete search history.

(56) References Cited

U.S. PATENT DOCUMENTS 7,644,249 B2 1/2010 Keeton et al.
7,885,938 B1 2/2011 Greene et al.
(Continued)

OTHER PUBLICATIONS

Dines, R., "Cloud-Based Disaster Recovery: Demystified", http://blogs.forrester.com/rachel_dines/12-03-22-cloud_based_disaster_recovery_demystified, Posted on Mar. 22, 2012, 3 pages.
(Continued)

*Primary Examiner* — Joseph O Schell
(74) *Attorney, Agent, or Firm* — Scully, Scott, Murphy & Presser, P.C.; Kurt P. Goudy, Esq.

(57) ABSTRACT

Increasing disaster resiliency in one aspect may comprise running an optimization algorithm that simultaneously solves for at least a first objective to increase a spread of a backup of virtual machines from a given site onto other sites in proportion to an amount of available space for backup at each site, a second objective to increase a number of backups at one or more of the other sites with low probability of system crash while reducing backups at one or more of the other sites with higher probability of system crash, and a third objective to minimize a violation of recovery time objectives of the virtual machines during recovery. One or more backup sites and one or more recovery sites in an event the given site crashes may be determined based on a solution of the optimization algorithm.

16 Claims, 6 Drawing Sheets

(52) U.S. Cl.
CPC ...... *G06F 11/1469* (2013.01); *G06F 11/1456* (2013.01); *G06F 11/1458* (2013.01); *G06F 2201/805* (2013.01); *G06F 2201/815* (2013.01)

(56) References Cited

U.S. PATENT DOCUMENTS

| | | |
|---|---|---|
| 2005/0108565 A1 | 5/2005 | Blea et al. |
| 2006/0095696 A1 | 5/2006 | Amano et al. |
| 2008/0154979 A1 | 6/2008 | Saitoh et al. |
| 2009/0327601 A1 | 12/2009 | Fienblit et al. |
| 2010/0274983 A1* | 10/2010 | Murphy .............. G06F 11/1456 711/162 |
| 2013/0054536 A1 | 2/2013 | Sengupta et al. |
| 2014/0006350 A1 | 1/2014 | Fukui et al. |
| 2014/0351375 A1* | 11/2014 | Flowers .............. G06F 11/1456 709/217 |
| 2015/0254150 A1* | 9/2015 | Gordon .............. G06F 11/1662 714/6.3 |

OTHER PUBLICATIONS

Gsoedl, J., "Blueprint for cloud-based disaster recovery", http://searchstorage.techtarget.com/magazineContent/Blueprint-for-cloud-based-disaster-recovery, First Published May 2011, 45 pages.
Wood, T., et al., "PipeCloud: Using Causality to Overcome Speed-of-Light Delays in Cloud-Based Disaster Recovery", SOCC'11, Oct. 27-28, 2011, 13 pages, Cascais, Portugal.
List of IBM Patents or Patent Applications Treated as Related, dated Aug. 15, 2016, 2 pages.

* cited by examiner

INCREASING DISASTER RESILIENCY BY HAVING A POD BACKED UP TO OTHER PEER PODS IN A SITE OR BEYOND

CROSS-REFERENCE TO RELATED APPLICATIONS

This application is a continuation of U.S. application Ser. No. 14/243,405 filed on Apr. 2, 2014, which is incorporated by reference herein in its entirety.

FIELD

The present application relates generally to computers, and computer applications, and more particularly to increasing disaster resiliency of computer systems.

BACKGROUND

Backup of virtual machines (VMs) is maintained by a storage management system within a point of delivery (PoD). If a disaster strikes the PoD, the VMs may not be able to be restored from the backups since those backups would be lost with the PoD that stores them. For example, in a cloud-based infrastructure, backup of existing VMs running in a cloud is typically achieved by using the storage subsystem within the cloud PoD, which hosts the VMs. If the cloud PoD (including storage) faces disaster then the VMs cannot be restored.

Current approaches to disaster management include periodic tape backups that are trucked offsite to continuous (a) synchronous replication of data between geographically separated sites. While the existing literature may point to usage of cloud for disaster recovery (DR), they do not address how the various workloads which are on a cloud can be backed up for disaster recovery in a way so that it is resilient and the recovery exposure is minimized.

BRIEF SUMMARY

A method of increasing disaster resiliency in computer systems, in one aspect, may comprise executing an optimization algorithm that solves simultaneously for at least a first objective to increase a spread of a backup of virtual machines from a given site onto other sites in proportion to an amount of available space for backup at each site, a second objective to increase a number of backups at one or more of the other sites with low probability of system crash while reducing backups at one or more of the other sites with higher probability of system crash, and a third objective to minimize a violation of recovery time objectives of the virtual machines during recovery. The method may also comprise determining one or more backup sites and one or more recovery sites in an event the given site crashes based on a solution of the optimization algorithm.

A system for increasing disaster resiliency in computer systems, in one aspect, may comprise an optimization model that solves simultaneously for at least a first objective to increase a spread of a backup of virtual machines from a given site onto other sites in proportion to an amount of available space for backup at each site, a second objective to increase a number of backups at one or more of the other sites with low probability of system crash while reducing backups at one or more of the other sites with higher probability of system crash, and a third objective to minimize a violation of recovery time objectives of the virtual machines during recover. A processor may be operable to execute the optimization model to determine one or more backup sites and one or more recovery sites in an event the given site crashes based on a solution of the optimization model, wherein algorithm.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 1 is a diagram illustrating a storage manager of a PoD configured to use a storage manager (SM) of a peer PoD to keep a backup in one embodiment of the present disclosure.

FIG. 2 is a diagram illustrating a disaster scenario in one embodiment of the present disclosure.

FIG. 3 is a diagram illustrating spreading of backups on Peer PoDs in one embodiment of the present disclosure.

FIG. 4 illustrates a scenario for modulating the spread to take care of RTOs of VMs when a disaster strikes a PoD in one embodiment of the present disclosure.

FIG. 5 is a flow diagram illustrating a method of the present disclosure in one embodiment.

FIG. 6 illustrates a schematic of an example computer or processing system that may implement a backup/recovery system in one embodiment of the present disclosure.

DETAILED DESCRIPTION

In one embodiment of the present disclosure, a method and a system may be provided that back up the VMs of a given PoD onto other PoDs or clouds, such that, optimal distribution of backups of a PoD across multiple other PoDs may be achieved, e.g., subject to a set of constraints such as subject to storage capacity, compute capacity, regulatory, and hazard (probability of failure) constraints.

In one embodiment of the present disclosure, the placement of backups also considers the Recovery Time Objectives (RTOs) of the individual VMs along with the network bandwidth between the PoD on which the backup lies and the Recovery PoD. Briefly, an RTO is the time that it could take to get a system back up and running after a failure.

In another aspect, a method and a system of the present disclosure consider optimally constructing the schedule of VMs backup on other PoDs to maximize resiliency from disasters affecting more than one PoD.

Yet in another aspect, a method and a system of the present disclosure consider constraints on the disaster proneness of the individual PoD as well as the network bandwidth between the two PoDs in deciding the schedule.

More generally, a method and a system may provide for an approach to compute an optimal recovery strategy once a PoD faces disaster. An optimal backup strategy may be determined that is recovery sensitive, as well as providing an optimal schedule for recovery in the face of disaster of a PoD.

In one aspect, a method and a system of the present disclosure may spread backups of VMs in a given PoD onto the storage infrastructure of other PoDs in such a way that the probability of reconstruction of lost VMs is maximized in the face of disasters. For example, a method and a system of the present disclosure in one embodiment may spread backups of VMs running in a given PoD onto the storage infrastructure of other PoDs with consideration for: (1) minimizing the risk-exposure to any other PoD when one of the PoD faces a disaster; and (2) minimizing penalty to be paid for missing RTO during recovery after a disaster.

A Point of Delivery (PoD) is a hosting environment where virtual machines (VMs) belonging to applications run. A PoD can play the following multiple roles simultaneously: It provides infrastructure (e.g., compute, storage, and network) for running virtual machines as well as tools to manage the infrastructure;

It also provides storage space to host backups or mirrors of VMs running on the same as well as other PoDs. It may be assumed that there is software or like called "storage manager" (or SM for short) running on a PoD that provides a capability to store a backup or a mirror of a VM running on another PoD;

A PoD can also act as a recovery PoD, i.e., in the event a PoD goes down then another PoD can provide the infrastructure to run the applications which were running on the disaster-struck PoD. The recovery process may entail transfer of the backup or mirror of the failed VM to the recovery PoD, set-up of the vLAN, and other components to bring up and run the VM.

Figure 1:
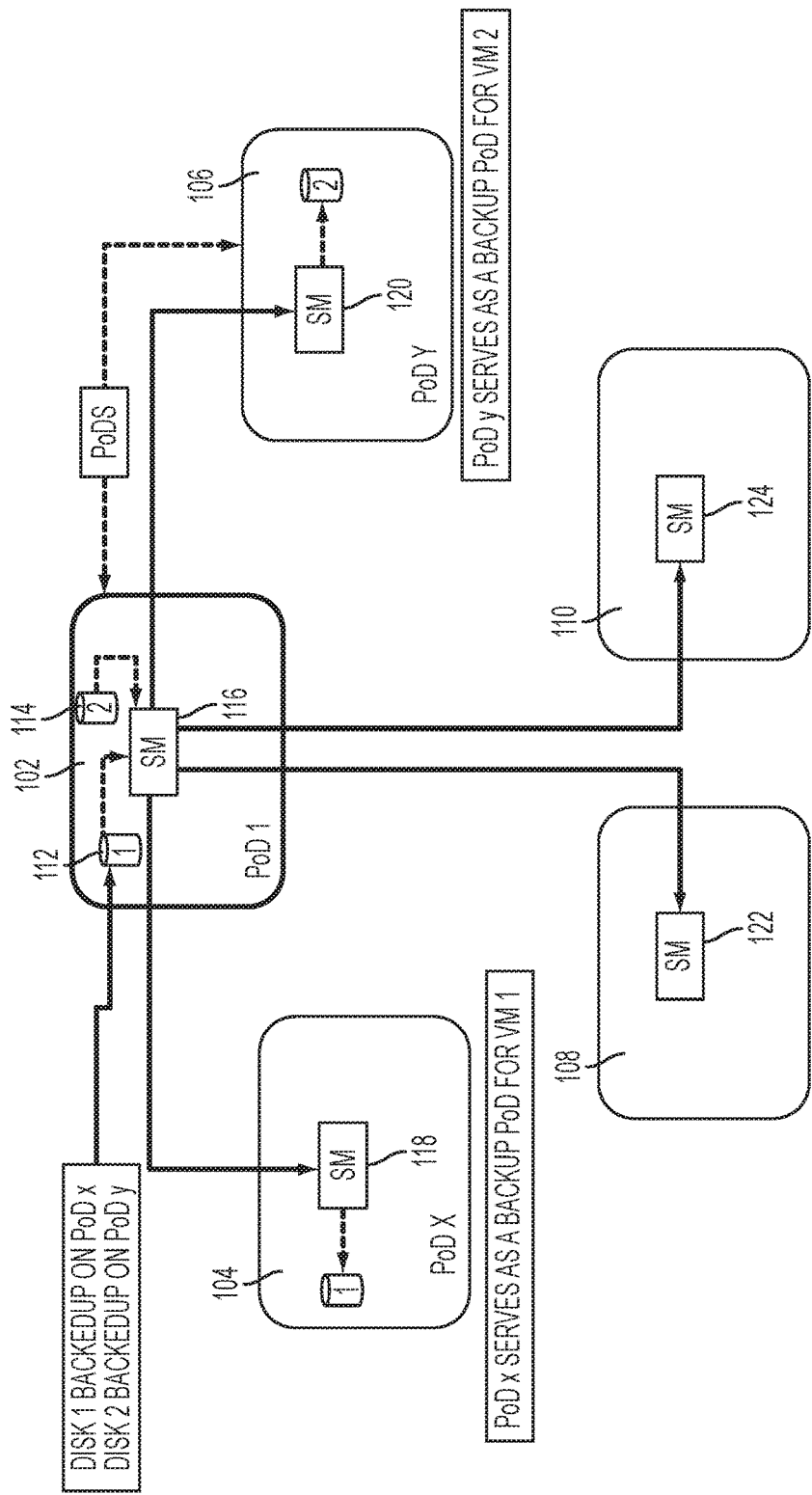

FIG. 1 is a diagram illustrating a storage manager of a PoD configured to use a storage manager (SM) of a peer PoD to keep a backup in one embodiment of the present disclosure. FIG. 1 shows multiple PoDs (e.g., 102, 104, 106, 108, 110). Each PoD may include at least one storage manager (e.g., 116, 118, 120, 122, 124). Storage manager at PoD 1 (102) may backup its disk 1 (112) on PoD x (104) and its disk 2 (114) on PoD y (106). Disk 1 (112) may contain VM 1 components; Disk 2 (114) may contain VM 2 components. Thus, PoD x (104) serves as a backup PoD for VM 1 of PoD 1; PoD y (106) serves as a backup PoD for VM 2 of PoD 1. In one aspect, an SM may store a backup locally as well as with a Peer PoD. Thus, PoD 1 (102) also may have backups of at least one of VM 1 and VM 2. In another aspect, PoD 1 (102) may store a backup only with Peer PoDs and not locally.

Figure 2:
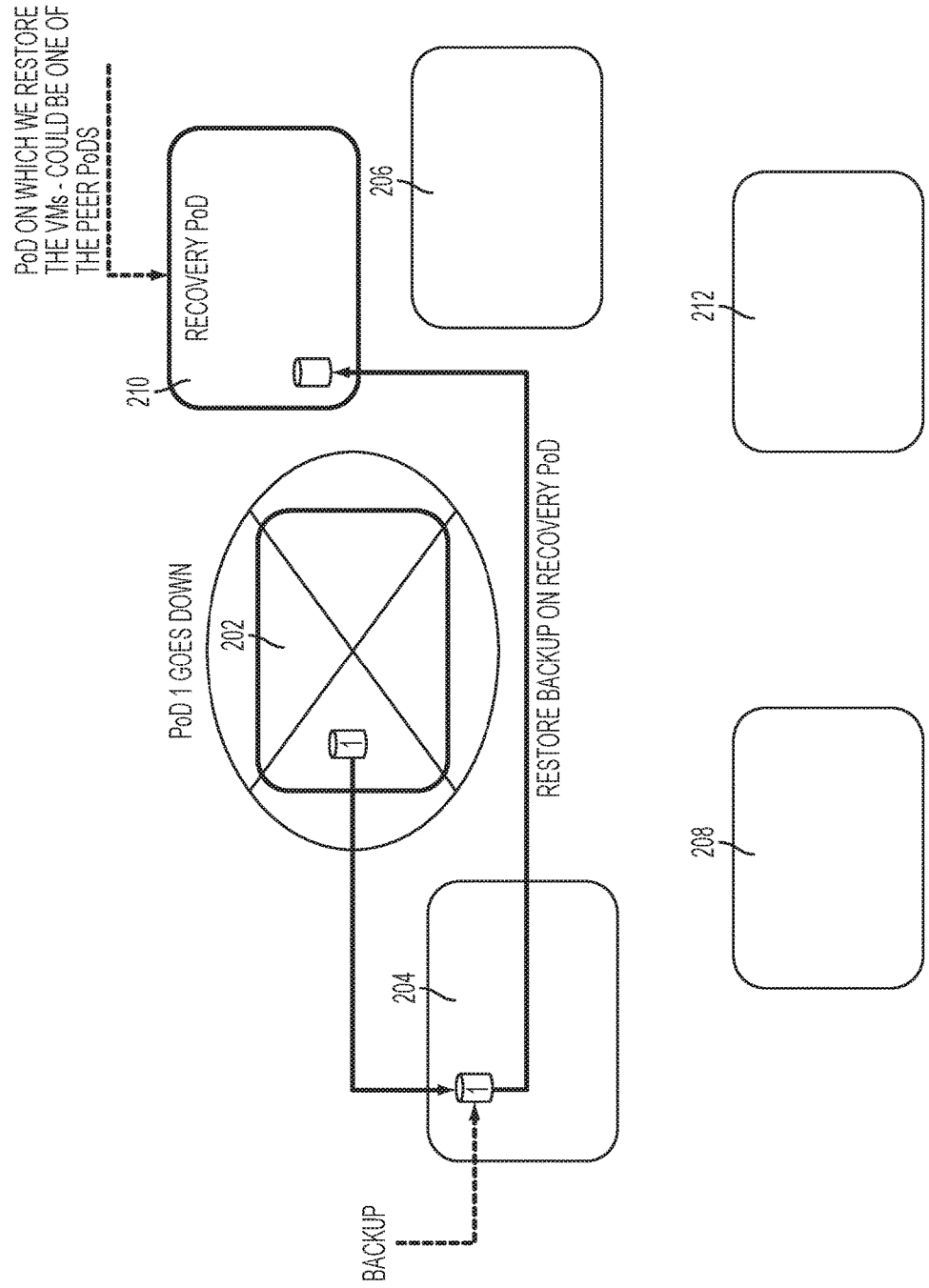

FIG. 2 is a diagram illustrating a disaster scenario in one embodiment of the present disclosure. For example, consider that PoD 1 202 (e.g., also shown in FIG. 1 at 102) faces disaster and goes down (fails or becomes not operational). In such a case, a backup may be restored on a recovery PoD. In one embodiment, a method of the present disclosure determines which of the remaining PoD would be the best to serve as a restore or recovery PoD. The PoD on which to restore the backup of the disaster struck PoD (102) may be one of the peer PoDs (e.g., 204, 206, 208, 210, 212). In this example, the recovery PoD 210 may be chosen based on an optimization model described further below.

Figure 3:
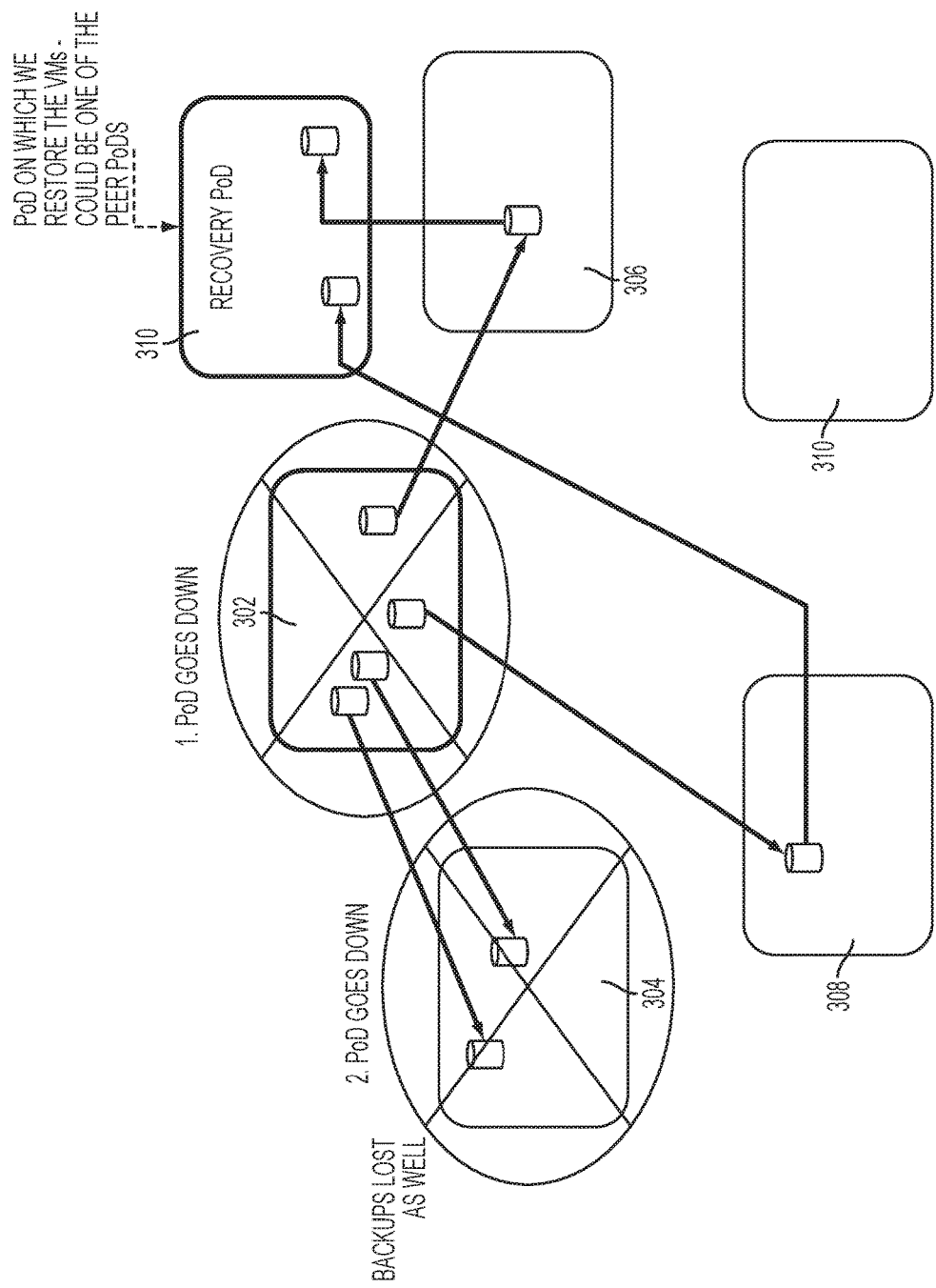

FIG. 3 is a diagram illustrating spreading of backups on Peer PoDs in one embodiment of the present disclosure. PoD (e.g., 302) may spread its backups over multiple Peer PoDs to mitigate further loss of data in the event the PoD serving as a backup PoD (e.g., 304) also goes down. Thus, PoD 302 may backup its disks across several PoDs (e.g., 304, 306, 308). Peer PoD determined to be a recovery PoD (310) would store the backed up disks from the PoDs (e.g., 306, 308), that are still running. Spreading reduces risk-exposure against multiple simultaneous disasters. A PoD is exposed to greater risk, if all its backups are on another PoD and that PoD faces disaster. Spreading the backups is also useful because in the face of disaster, the transfer of backups back onto the Recovery PoD may take place using different networks.

A processing capacity of a PoD for backup may depend on a storage manager (SM). For the sake of explanation only, a PoD site that has one storage manager is shown. It is noted, however, the methodology of the present application also apply to a site with more than one storage manager. Also assume that the capacity of the PoD for backup is equivalent to the capacity of the SM instance within the site, which for example, can handle 750 VM clients. An average size of a VM to be backed up in this example may be 170 gigabytes (GB). 80% utilization and 5% change rate per VM per day implies 5.1 terabytes (TB) of generated data per day for the SM instance. For a 12 hour backup window the data rate is 118 megabytes (MB) per second (sec). This is the capacity of an SM instance or the Maximum backup flow handled by the SM instance.

An optimization problem then may be formulated as described below. The following notations are used:

All sites that host VMs (for simplicity of exposition) can also host a backup of a VM running on a remote site, and the sites are indexed by $i \in \{1, 2, \ldots, N\}$.

$C_i$:=processing capacity of PoD site i, i.e., the maximum rate of flow allowed for a given SM instance at a site.

$n_i$:=# of VM instances hosted/running at site i.

$s_{ij}$:=rate of "backup" flow for VM j hosted/running at site i.

$p_i$:=the probability that site i will suffer a disaster or fails.

$A_i$:=available space at site i for keeping backups from other PoD sites.

$ds_{ij}$:=storage size of VM j hosted/running at site i.

$x_{kij}$=1 if VM j hosted at site i is backed up at site k; otherwise 0.

The following illustrate processing and Storage Capacity Constraints.

A processing Capacity constraint is represented as $$\sum_{i=1\ldots N} \sum_{j=1\ldots n_i} s_{ij} x_{kij} \le C_k,$$

wherein the first term is the sum of the rate of backup flows into the SM of site k and it should be less than the capacity of site k which is $C_k$.

Storage Capacity constraint is represented by $$\sum_{i=1\ldots N} \sum_{j=1\ldots n_i} ds_{ij} x_{kij} \le A_k,$$

wherein the first term is the sum of the disk sizes of the VMs being backed up at the site k and it should be less than the storage capacity of site k available for keeping backups from other sites, which is $A_k$.

In one embodiment of the present disclosure, data privacy constraints may be also considered into an optimization formulation. For example, a data privacy constraint may dictate that a data disk in one PoD cannot be backed up onto another PoD because of government policies or customer policies restricting data to be stored outside a region. Such constraint may be included as follows. For example, suppose PoD x hosts the VM j and the data for VM j cannot be backed up on PoD y, then the following constraint can be added for each combination of x and y, upfront before solving the optimization problem: $x_{yxj}=0$.

Each VM is backed up on at least one PoD different from where it is running, which may be represented as $$\sum_{k \in \{1 \ldots N\}, k \neq i} x_{kij} \geq 1.$$

This setup allows for backing up a VM running on a PoD onto potentially multiple peer PoDs. This further reduces the risk exposure to disasters.

An objective function that increases the spread of the backups from a site onto other sites in one embodiment of the present disclosure may be as follows:

$$\text{minimize} \sum_{i=1 \ldots N} \sum_{(r,s), r \neq s \neq i, r, s \in \{1 \ldots N\}} \left( \frac{A_s \sum_{j=1 \ldots n_i} x_{rij} - A_r \sum_{j=1 \ldots n_i} x_{sij}}{A_r + A_s} \right)^2,$$

where $$\left( \frac{A_s \sum_{j=1 \ldots n_i} x_{rij} - A_r \sum_{j=1 \ldots n_i} x_{sij}}{A_r + A_s} \right)$$

represent "imbalance" in number of hosted backups of site i on sites r and s.

In the above objective function, an objective is to increase the spread of the backup of VMs from a given site i onto other sites in proportion to the amount of available space for backup at each PoD. Thus, for a given site i and a pair of backup sites, say r and s, the number in the ( . . . ) is defined as the imbalance of the number of backups kept at each site. The outermost summation considers each PoD i where VMs run and allocate one or more backups of each VM onto other PoDs keeping in view the available space for backup at each PoD. In one aspect, the imbalance definition as below could also suffice:

$$\sum_{j=1 \ldots n_i} x_{rij} - \sum_{j=1 \ldots n_i} x_{sij}$$

In one aspect, the above objective function may be normalized by square of $n_1 + n_2 + \ldots + n_N$.

In one embodiment of the present disclosure, spread may depend on the probability of disaster (or failure) at a site. For example, a hosting site i has probability of disaster or failure, denoted by $p_i$. This probability may depend on several factors, e.g., which may include the characteristics of the area of a site and region of the site. For example, conditions such as floods, tornados, hurricanes, snow storms, pandemics, closeness of the airport associated with the area, and/or characteristics such as a region tendency for terrorist attacks, financial failures, train derailments with toxic materials, political situation, and other, may be considered for the probability of disaster occurring at the site.

If $p_i$ is high then it might make sense to put relatively fewer backups at site i as compared to another site with a lower $p_i$.

To capture this, in one embodiment of the present disclosure, a method of the present disclosure in one embodiment may (weighted) add to the objective function introduced above the following:

$$\sum_{i=1 \ldots N} \sum_{(r,s), r \neq s \neq i, r, s \in \{1 \ldots N\}} \left( \frac{f(p_r) \sum_{j=1 \ldots n_i} x_{rij} - f(p_s) \sum_{j=1 \ldots n_i} x_{sij}}{f(p_r) + f(p_s)} \right)^2$$

The function f(.) could simply be $p_i$ or such that as the argument increases the f-value increases as well (monotonicity). The above term forces the optimization problem to try and increase number of backups at sites with low $p_i$ while reducing backups at PoD sites with higher $p_i$.

Again, the above term may be normalized by $n_1 + n_2 + \ldots + n_N$.

When a PoD faces a disaster, all hosted VMs may be lost. In the present disclosure in one embodiment, it is assumed that one of the remaining sites will be designated as a recovery site where the lost VMs will be brought up. In one aspect, a recovery site's bandwidth with the backup sites determines the speed at which a VM backup from the backup sites can be transferred to the recovery site. Different data transfer approaches may include a full disk transfer over the network; transferring only the delta, e.g., assuming that a base image already exists at the recovery site (all other approaches can be subsumed by this one); physically transferring data disks to the recovery site (also called: sneaker net); and physically transferring tapes to the recovery site. A choice of the above approach affects the spread of the backups. For example, it may be desirable to place a backup for a VM with low RTO onto a site which has higher bandwidth with the recovery site and that depends on the speed of transfer of data transfer. This problem leads to a job-shop scheduling problem to be incorporated into an overall problem in the present disclosure. In another aspect, the virtual machines could be brought up in the PoD in which they are backed up and the disks subsequently transferred to the designated recovery PoD as well.

In the present disclosure in one embodiment, a plurality of policies can be adopted for redistributing the lost backups. For example, the lost backups are delegated to the recovery site itself; the lost backups are redistributed amongst the available sites. In the second case, the optimization problem of the present disclosure in one embodiment may be rerun with all other variables fixed except for the backups to be redistributed. The data change rate of the backups may be as before.

Applications typically include multiple VMs. Thus, a solution in one embodiment of the present disclosure is cognizant of this fact. For example, while restoring a particular application onto a recovery PoD, it may be taken into account that all its VMs are recovered onto the PoD in order to meet the RTO. Thus, in one embodiment of the present disclosure, Recovery Time Objectives (RTO) may be considered with respect to applications and not individual VMs. In the present disclosure, it may be also assumed that a matrix $\{a_{cij}\}$ exists such that $a_{cij}$ is 1 if VM j, hosted on site i, belongs to application c otherwise 0. Assume that c ranges from 1 to M. In one embodiment of an optimization model of the present disclosure, a VM can belong to multiple applications.

In one embodiment of the present disclosure, the following simplifying assumptions may also be made with respect to the transfer of a disk or delta over the network from a site to another site. When the backup data is being transferred from a backup PoD site to a recovery site, the backup data for different VMs may be transferred in a sequence and the available network bandwidth is wholly dedicated to a VM's data and not split across VMs. Transfer of data is work-conserving, i.e., during the entire transfer of data of all VMs whose backup is hosted on a given PoD site, no time is wasted during the transfer.

Consider for example the following example scenario. Job 1 requires 10 units; job 2 requires 10 units. Let a server process at the rate of 2 units per second. If done in parallel then both will miss their RTO of 5 seconds by 5 units. If Job 1 is executed first then it will meet its RTO, while the second job will miss its RTO by 5 units.

Figure 4:
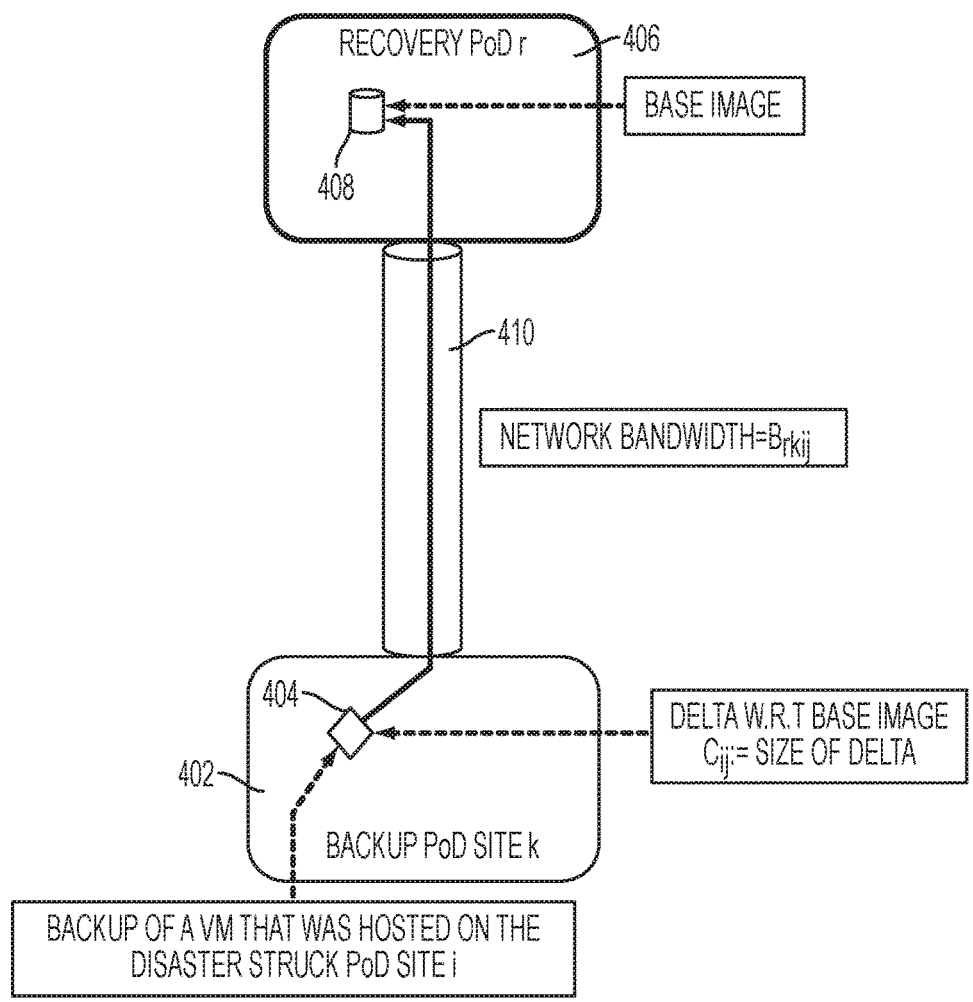

FIG. 4 illustrates a scenario for modulating the spread of backups to take care of RTOs of VMs when a disaster strikes a PoD in one embodiment of the present disclosure. Backup PoD site k (402) has a backup of VM 404 that was hosted on the disaster struck PoD site i. In this example, the backup of VM 404 may be a delta with respect to a base image, wherein $c_{ij}$ represents the size of the delta. Recovery PoD r (406) may already have a base image 408 of the VM. The recovery time depends on at least the network bandwidth ($b_{rkij}$) 410.

Let $RTO_c$ denote the RTO of the application c. $RTO_c$ represents the maximum tolerable time for recovering the data and bringing the application back online. Let $c_{ij}$ denote the actual delta or difference between the base image and backup that was taken for VM j at site i, before the disaster struck site i. It is assumed that the base images are populated at the recovery PoD so that only this delta of size $c_{ij}$ need be transferred. Let $b_{rkij}$ denote the network bandwidth between backup PoD k and recovery PoD r site given site i has fallen (k≠i, r≠i); note that it is infinity (or a very large positive number) if r=k, it is 0 if $x_{rij}$=0. Also, in one embodiment of the present disclosure, assume that only one backup delta can be transferred at a time between site k and recovery PoD; time taken for a delta depends on its size and connection bandwidth, and is given by:

$$\frac{c_{ij}}{b_{rkij}}.$$

Base images may be constructed and used, for example, as follows. For example, all the images are grouped into one or more groups. Each VM disk within a group is considered as a file on the operating system and divided into "chunks" of a given or possibly variable size. A base image then can be constructed by concatenating at the i-th position that chunk that occurs most frequently across all the images in the group at that position. The resulting image is then called the base image for that group. The above method can be executed on the PoD where the VMs are running. The base images can be distributed to PoDs which could act as a recovery PoD for the given PoD.

Along with the base image for a group, a corresponding manifest (typically a very small file as compared to the size of the base image) may be constructed that describes the base image in terms of the hash values of the chunks in the base image. Once recovery is in progress, the manifest may be sent from the recovery PoD to all the backup PoDs which are hosting the backups to be transferred to the Recovery PoD. The backup PoDs use the manifest to determine which chunks are already in the base image and therefore need not be sent, and thus only send those chunks which are not present in the base image in the various locations in the base image.

In one embodiment, an optimization model of the present disclosure minimizes the violation of RTOs of VMs during restore after disaster. Consider the following notation. Notation: $x_{rnkij}$=1 if VM j is hosted on site i, with its backup done on site k, and if it is the n-th transfer to the recovery site r from site k after a disaster occurs for site i, otherwise it is 0.

The violation of the application c's RTO, i.e., $RTO_c$ when site i is disaster struck may be defined as:

$$v_{ric} := \max\left(\max_{k=1\ldots N, k\neq i} \max_{j=1\ldots n_i} \min_{n=1\ldots n_i} a_{cij} \right.$$
$$\left. x_{nkij}\left[\frac{c_{ij}}{b_{rkij}} + \sum_{q=1\ldots n_i, q\neq j} \sum_{l=1\ldots n-1} x_{rlkiq}\frac{c_{iq}}{b_{rkiq}} - RTO_c\right], 0\right)$$

The objective function of the present disclosure may be enhanced with the following term which sums up the expected penalty for the RTO violations for all the applications for a given site i facing disaster, and then finds the maximum of such sums across all sites, $$\max_{i=1\ldots N} \max_{r=1\ldots N, r\neq i} \sum_{c=1\ldots M} p_i \psi_c(v_{ric}),$$

where $\psi_c(.)$ is the normalized penalty function for RTO violation of c. Note, instead of "max", it may be possible to take an "average" or "median" for the outermost "max" term.

The above object function (1) finds the best available PoD to act as a recovery PoD, in the event a given PoD crashes; and (2) includes the cost of missing an RTO.

As discussed above, the RTO violation of application c when PoD i has fallen and recovery PoD is r may be represented as:

$$v_{ric} := \max\left(\max_{k=1\ldots N, k\neq i} \max_{j=1\ldots n_i} \min_{n=1\ldots n_i} a_{cij} \right.$$
$$\left. x_{nkij}\left[\frac{c_{ij}}{b_{rkij}} + \sum_{q=1\ldots n_i, q\neq j} \sum_{l=1\ldots n-1} x_{rlkiq}\frac{c_{iq}}{b_{rkiq}} - RTO_c\right], 0\right)$$

The term, $$x_{nkij}\left[\frac{c_{ij}}{b_{rkij}} + \sum_{q=1\ldots n_i, q\neq j} \sum_{l=1\ldots n-1} x_{rlkiq}\frac{c_{iq}}{b_{rkiq}}\right],$$

represents the time for complete transfer of the delta corresponding to VM j when it is the n-th transfer from site k to the recovery site r, given that site i where it was hosted is disaster struck.

The term, $$\min_{n=1\ldots n_i} a_{cij}x_{nkij}\left[\frac{c_{ij}}{b_{rkij}} + \sum_{q=1\ldots n_i, q\neq j} \sum_{l=1\ldots n-1} x_{rlkiq}\frac{c_{iq}}{b_{rkiq}} - RTO_c\right],$$

represents the RTO violation for application c due to VM j hosted on disaster-struck site i and backed-up on site k and transferred to recovery site r.

The term, $$\max_{j=1 \ldots n_i} \min_{n=1 \ldots n_i} a_{cij} x_{nkij} \left[ \frac{c_{ij}}{b_{rkij}} + \sum_{q=1 \ldots n_i, q \neq j} \sum_{l=1 \ldots n-1} x_{rlkiq} \frac{c_{iq}}{b_{rkiq}} - RTO_c \right],$$

represents the RTO violation for application c when site i is disaster-struck and some of its hosted VMs are backed-up on site k which have to be transferred to recovery site r.

The term, $$\max_{k=1 \ldots N, k \neq i} \max_{j=1 \ldots n_i} \min_{n=1 \ldots n_i} a_{cij} x_{nkij} \left[ \frac{c_{ij}}{b_{rkij}} + \sum_{q=1 \ldots n_i, q \neq j} \sum_{l=1 \ldots n-1} x_{rlkiq} \frac{c_{iq}}{b_{rkiq}} - RTO_c \right],$$

represents the RTO violation for application c when site i is disaster-struck (could be a negative value) and when the recovery PoD is r The following constraints may be considered, e.g., due to introduction of $x_{rnkij}$ variables.

$x_{rnkij} \neq x_{rnkis}$ $j \neq s$: Backup of two VMs hosted on disaster struck site i and backed-up on k cannot be started in parallel.

$$\sum_{j=1 \ldots n_i} x_{r(n-1)kij} \geq \sum_{j=1 \ldots n_i} x_{rnkij} \leq 1:$$

If VM j's delta is the n-th transfer there is some other VM whose delta is transferred at the (n−1)-th position; for the n-th position there may be only one backup.

$$\sum_r \sum_n x_{rnkij} = x_{kij}:$$

Links the variables $x_{kij}$ with $x_{rnkij}$.

$$\sum_n \sum_k x_{ankip} + \sum_n \sum_k x_{bnkiq} = 1: a \neq b, a \neq i, b \neq i, p \neq q.$$

These constraints ensure that only one of the target recovery PoDs is chosen for a given fallen PoD. There are, for every i, a total of $_{ni}$ C 2*N*N constraints.

$$\sum_{k \neq i} \sum_{r \neq i} \sum_n x_{rnkij} = 1:$$

VM j running on the fallen PoD i is transferred only at most once from any of the backup PoDs where it may be backed-up.

$$\sum_{p=1 \ldots N} \sum_{q=1 \ldots n_i} s_{pq} x_{rpq} + \sum_{j=1 \ldots n_i} \sum_{n=1 \ldots n_i} \sum_{k=1 \ldots N, k \neq i} s_{ij} x_{rnkij} \leq C_r:$$

Processing capacity constraints for each pair (r, i), r≠i.

$$\sum_{p=1 \ldots N} \sum_{q=1 \ldots n_i} ds_{pq} x_{rpq} +$$

$$\sum_{j=1 \ldots n_i} \sum_{n=1 \ldots n_i} \sum_{k=1 \ldots N, k \neq i} ds_{ij} x_{rnkij} \leq A_r$$

$$\sum_{n=1 \ldots n_i} \sum_{k=1 \ldots N, k \neq i} x_{rnkis} = \sum_{n=1 \ldots n_i} \sum_{k=1 \ldots N, k \neq i} x_{rnkit}:$$

Storage capacity constraints for each pair (r, i), r≠i.

$$\sum_{n=1 \ldots n_i} \sum_{k=1 \ldots N, k \neq i} x_{rnkis} = \sum_{n=1 \ldots n_i} \sum_{k=1 \ldots N, k \neq i} x_{rnkit}:$$

all VMs s and t that belong to site i (that is disaster struck) are transferred to the recovery pod r. Note that there are a total of $n_i$ VMs on pod i.

An overall optimization problem may be represented as follows:

$$\text{minimize } w_1 \sum_{i=1 \ldots N} \sum_{(r,s) r \neq s \neq i, r,s \in \{1 \ldots N\}} \left( \frac{A_s \sum_{j=1 \ldots n_i} x_{rij} - A_r \sum_{j=1 \ldots n_i} x_{sij}}{A_r + A_s} \right)^2 +$$

$$w_2 \sum_{i=1 \ldots N} \sum_{(r,s) r \neq s \neq i, r,s \in \{1 \ldots N\}} \left( \frac{f(p_r) \sum_{j=1 \ldots n_i} x_{rij} - f(p_s) \sum_{j=1 \ldots n_i} x_{sij}}{f(p_r) + f(p_s)} \right)^2 +$$

$$w_3 \max_{i=1 \ldots N} \max_{r=1 \ldots N, r \neq i} \sum_{c=1 \ldots M} p_i \psi_c(v_{ric})$$

subject to (s.t.) the above specified constraints. w1, w2, and w3 represent weights associated with each term.

Figure 5:
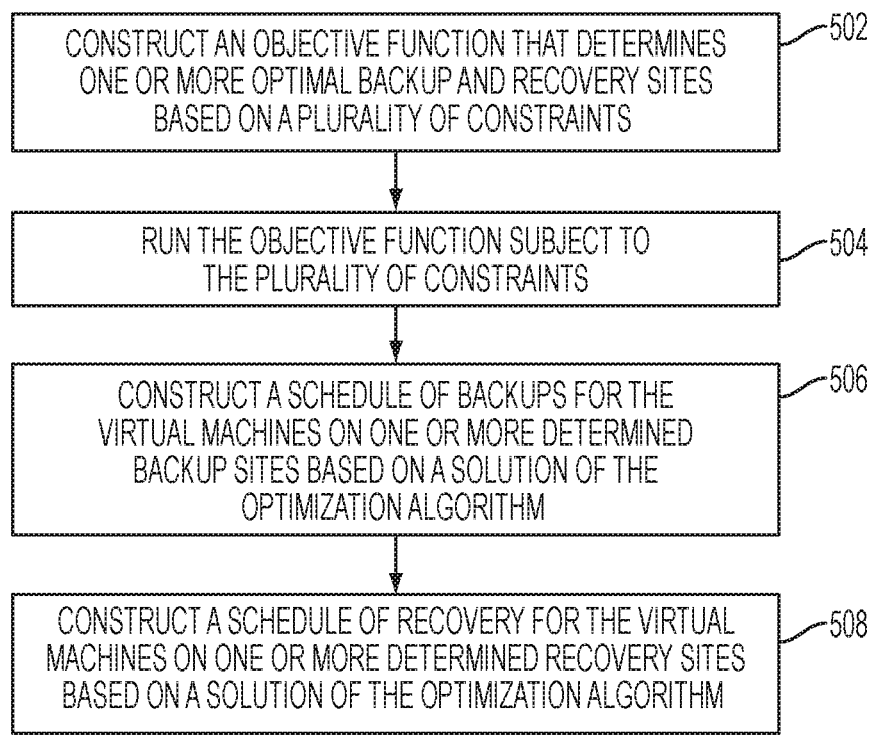

FIG. 5 is a flow diagram illustrating a method of the present disclosure in one embodiment. At 502, an optimization algorithm may be constructed. As described above, the optimization algorithm may simultaneously solve for or integrate at least a first objective to increase a spread of a backup of virtual machines from a given site onto other sites in proportion to an amount of available space for backup at each site, a second objective to increase a number of backups at one or more of the other sites with low probability of system crash while reducing backups at one or more of the other sites with higher probability of system crash, and a third objective to minimize a violation of recovery time objectives of the virtual machines during recovery. At 504, the objective function is run on a processor, e.g., to determine one or more backup sites and one or more recovery sites in an event the given site crashes based on a solution of the optimization algorithm. The given site and the other sites comprise points of delivery that comprise hosting environments where the virtual machines belonging to one or more applications run. In one aspect, and as described in more detail above, the optimization algorithm is solved subject to a processing capacity constraint associated with at least the other sites, storage capacity constraint associated with at least the other sites, and data privacy constraints associated with at least the virtual machines to be backed up.

At 506, a schedule of backups for the virtual machines on one or more of the other sites may be constructed based on a solution of the optimization algorithm. The optimization problem may be solved using a host of techniques such as simulated annealing, branch and bound, etc. In one embodiment of the present disclosure, the output of the solution provides which VM's backup will be hosted on which site. In one embodiment of the present disclosure, frequency of backup is decided based on the RPO (recovery point objective). The RPO may also decide the replication schedule and the amount of processing capacity of a PoD for backup that is utilized by a VM. For instance, the more closer the RPO is to 0, the faster is the replication rate and hence the more processing capacity of the PoD where backup is situated is utilized. Thus in the present disclosure in one embodiment, the rate of backup flow $s_{ij}$ is predetermined based on the RPO for VM j on Site i.

When disaster strikes Site i the schedule that is to be constructed is to determine what is the recovery PoD to be used and thereafter which backup of a VM j on Site i has to be transferred to the recovery PoD and in which order given that different applications c have different $RTO_c$. In one embodiment of the present disclosure, the first task of finding out which should be the recovery PoD is through the solution of the following for each potential recovery PoD:

$$r^* := \arg\min_{r=1\ldots N, r\neq i} \max_{i=1\ldots N} \psi_c(v_{ric})$$

subject to the constraints specified above.

The above finds the PoD r* that minimizes the penalty to be paid in recovering the lost applications on Site i. The solution to the above problem also yields the instantiation of $x_{r^*nkij}$ for i and r* fixed and for n being in $\{1, \ldots, n_i\}$, and k in $\{1 \ldots N\}$ (but r not equal to i), and j being the index over all the VMs on Site i.

Thus at 508, a schedule of recovery for the virtual machines on one or more of the other sites may be constructed based on a solution of the optimization algorithm.

In one embodiment of the present disclosure, a graphical tool may incorporate the above-described methodology for interacting with a user, e.g., presenting selected sites as backup and recovery sites according to the optimization performed, e.g., automatically by a computing processor.

Figure 6:
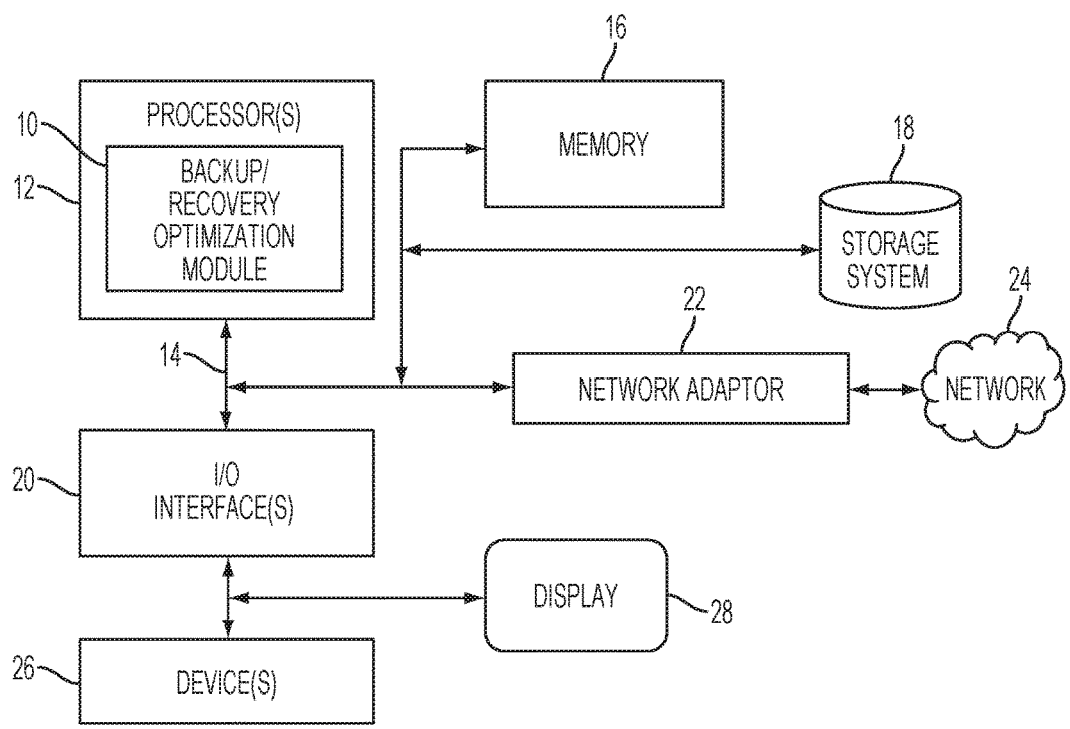

FIG. 6 illustrates a schematic of an example computer or processing system that may implement a backup/recovery system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an optimization module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of increasing disaster resiliency in a computer system, comprising:
    executing, by a processor, an optimization algorithm that solves simultaneously for at least a first objective to increase a spread of a backup of virtual machines from a given site onto other sites in proportion to an amount of available space for backup at each site and a second objective to increase a number of backups at one or more of the other sites with low probability of system crash while reducing backups at one or more of the other sites with higher probability of system crash, the optimization algorithm minimizing a sum of the first objective that is weighted and the second objective that is weighted, the optimization algorithm being solved subject to at least data privacy constraints associated with at least the virtual machines to be backed up; and
    determining at least a backup site and a recovery site for the given site based on a solution of the optimization algorithm,
    further comprising transferring the virtual machines on one or more of the other sites based on a solution of the optimization algorithm to backup the virtual machines according to a frequency of backup determined based on a recovery point objective.

2. The method of claim 1, wherein a third objective to minimize a violation of recovery time objective of the virtual machines during recovery is solved simultaneously with the first objective and the second objective, the optimization algorithm minimizing a sum of the first objective that is weighted and the second objective that is weighted and the third objective that is weighted, wherein the violation of recovery time objective of the virtual machines is associated at least a recovery time objective associated with an individual application running on at least one of the virtual machines.

3. The method of claim 2, wherein the third objective is formulated as:

$$\max_{i=1 \ldots N} \max_{r=1 \ldots N, r \neq i} \sum_{c=1 \ldots M} p_i \psi_c(v_{ric}),$$

wherein
  $\psi_c(.)$ is a normalized penalty function for recover time objective violation of application c, sites comprising the given site and the other sites are indexed by $i \in \{1, 2, \ldots, N\}$,
  $p_i$ represents probability that site i crashes,
  $n_i$ represents a number of VM instances hosted at site i,
  $s_{ij}$ represents a rate of backup flow for VM j hosted at site i,
  $x_{kij}=1$ if VM j hosted at site i is backed up at site k, otherwise 0.

4. The method of claim 1, wherein the given site and the other sites comprise points of delivery comprising hosting environments where virtual machines belonging to one or more applications run.

5. The method of claim 1, wherein constraints to the optimization algorithm further include a processing capacity constraint associated with at least the other sites and storage capacity constraint associated with at least the other sites.

6. The method of claim 1, wherein the first objective is formulated as:
    minimize $$\sum_{i=1 \ldots N} \sum_{(r,s) r \neq s \neq i, r,s \in \{1 \ldots N\}} \left( \frac{A_s \sum_{j=1 \ldots n_i} x_{rij} - A_r \sum_{j=1 \ldots n_i} x_{sij}}{A_r + A_s} \right)^2,$$

wherein sites comprising the given site and the other sites are indexed by $i \in \{1, 2, \ldots, N\}$,
  $n_i$ represents a number of VM instances hosted at site i,
  $s_{ij}$ represents a rate of backup flow for VM j hosted at site i,
  $A_i$ represents available space at site i for keeping backups from other sites,
  $x_{kij}=1$ if VM j hosted at site i is backed up at site k, otherwise 0.

7. The method of claim 1, wherein the first objective is formulated as:
    minimize $$\sum_{i=1 \ldots N} \sum_{(r,s) r \neq s \neq i, r,s \in \{1 \ldots N\}} \left( \sum_{j=1 \ldots n_i} x_{rij} - \sum_{j=1 \ldots n_i} x_{sij} \right),$$

wherein
sites comprising the given site and the other sites are indexed by $i \in \{1, 2, \ldots, N\}$,
  $n_i$ represents a number of VM instances hosted at site i,
  $s_{ij}$ represents a rate of backup flow for VM j hosted at site i,
  $x_{kij}=1$ if VM j hosted at site i is backed up at site k, otherwise 0.

8. The method of claim 1, wherein the second objective is formulated as:

$$\sum_{i=1 \ldots N} \sum_{(r,s) r \neq s \neq i, r,s \in \{1 \ldots N\}} \left( \frac{f(p_r) \sum_{j=1 \ldots n_i} x_{rij} - f(p_s) \sum_{j=1 \ldots n_i} x_{sij}}{f(p_r) + f(p_s)} \right)^2,$$

wherein
- function f(.) represents a crash probability function,
- sites comprising the given site and the other sites are indexed by $i \in \{1, 2, \ldots, N\}$,
- $n_i$ represents a number of VM instances hosted at site i,
- $s_{ij}$ represents a rate of backup flow for VM j hosted at site i,
- $x_{kij} = 1$ if VM j hosted at site i is backed up at site k, otherwise 0.

9. A computer readable storage device storing a program of instructions executable by a machine to perform a method of increasing disaster resiliency in a computer system, the method comprising:

executing, by a processor, an optimization algorithm that solves simultaneously for at least a first objective to increase a spread of a backup of virtual machines from a given site onto other sites in proportion to an amount of available space for backup at each site and a second objective to increase a number of backups at one or more of the other sites with low probability of system crash while reducing backups at one or more of the other sites with higher probability of system crash, the optimization algorithm minimizing a sum of the first objective that is weighted and the second objective that is weighted, the optimization algorithm being solved subject to at least data privacy constraints associated with at least the virtual machines to be backed up; and determining at least a backup site and a recovery site for the given site based on a solution of the optimization algorithm, further comprising transferring the virtual machines on one or more of the other sites based on a solution of the optimization algorithm to backup the virtual machines according to a frequency of backup determined based on a recovery point objective.

10. The computer readable storage device of claim 9, wherein a third objective to minimize a violation of recovery time objective of the virtual machines during recovery is solved simultaneously with the first objective and the second objective, the optimization algorithm minimizing a sum of the first objective that is weighted and the second objective that is weighted and the third objective that is weighted, wherein the violation of recovery time objective of the virtual machines is associated at least a recovery time objective associated with an individual application running on at least one of the virtual machines.

11. The computer readable storage device of claim 9, wherein the given site and the other sites comprise points of delivery comprising hosting environments where virtual machines belonging to one or more applications run.

12. The computer readable storage device of claim 9, wherein constraints to the optimization algorithm further include a processing capacity constraint associated with at least the other sites and storage capacity constraint associated with at least the other sites.

13. A system for increasing disaster resiliency in a computer system, comprising:

a computer optimization model that solves simultaneously for at least a first objective to increase a spread of a backup of virtual machines from a given site onto other sites in proportion to an amount of available space for backup at each site and a second objective to increase a number of backups at one or more of the other sites with low probability of system crash while reducing backups at one or more of the other sites with higher probability of system crash, the optimization algorithm minimizing a sum of the first objective that is weighted and the second objective that is weighted, the optimization algorithm being solved subject to at least data privacy constraints associated with at least the virtual machines to be backed up; and a hardware processor executing the computer optimization model and determining at least a backup site and a recovery site for the given site based on a solution of the optimization algorithm, wherein the virtual machines are transferred to one or more of the other sites based on a solution of the optimization algorithm to backup the virtual machines according to a frequency of backup determined based on recovery point objectives associated with the virtual machines.

14. The system of claim 13, wherein a third objective to minimize a violation of recovery time objective of the virtual machines during recovery is solved simultaneously with the first objective and the second objective, the optimization algorithm minimizing a sum of the first objective that is weighted and the second objective that is weighted and the third objective that is weighted, wherein the violation of recovery time objective of the virtual machines is associated at least a recovery time objective associated with an individual application running on at least one of the virtual machines.

15. The system of claim 13, wherein the given site and the other sites comprise points of delivery comprising hosting environments where virtual machines belonging to one or more applications run.

16. The system of claim 13, wherein constraints to the optimization algorithm further include a processing capacity constraint associated with at least the other sites and storage capacity constraint associated with at least the other sites.

* * * * *